United States Patent
Sung et al.

(10) Patent No.: US 11,490,141 B2
(45) Date of Patent: Nov. 1, 2022

(54) CONTROL SIGNAL TRANSMISSION CIRCUIT AND CONTROL SIGNAL RECEIVING CIRCUIT FOR AUDIO/VIDEO INTERFACE

(71) Applicant: REALTEK SEMICONDUCTOR CORPORATION, Hsinchu (TW)

(72) Inventors: Lien-Hsiang Sung, Hsinchu (TW);
Wun-Lin Chang, Hsinchu (TW);
Shan-Yuan Yang, Hsinchu (TW);
Tzu-Min Yeh, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/177,241

(22) Filed: Feb. 17, 2021

(65) Prior Publication Data

US 2021/0360296 A1 Nov. 18, 2021

(30) Foreign Application Priority Data

May 12, 2020 (TW) .................................. 109115718

(51) Int. Cl.
*H04N 21/2368* (2011.01)
*H04N 21/434* (2011.01)
(Continued)

(52) U.S. Cl.
CPC ..... *H04N 21/2368* (2013.01); *H04N 21/2335* (2013.01); *H04N 21/4341* (2013.01); *H04N 21/4343* (2013.01); *H04N 21/63* (2013.01)

(58) Field of Classification Search
CPC ........... H04N 21/2335; H04N 21/2368; H04N 21/4341; H04N 21/4343; H04N 21/63
See application file for complete search history.

(56) References Cited

U.S. PATENT DOCUMENTS 4,215,369 A * 7/1980 Iijima ....................... H04L 5/24
375/240.01
4,700,228 A * 10/1987 Heerah .................. H04N 5/262
348/580
(Continued)

FOREIGN PATENT DOCUMENTS

WO WO02/49314 A2 6/2002

OTHER PUBLICATIONS

OA letter of the counterpart TW application(appl. No. 109115718) mailed on Jul. 23, 2021. Summary of the OA letter: (1) Claim(s) 1 and 3-8 is/are rejected under Patent Law Article 22(1) as being anticipated by reference 1 (WO02/49314A2). (2) Claim(s) 9-10 is/are rejected under Patent Law Article 22(2) as being unpatentable over reference 1 (WO02/49314A2).

*Primary Examiner* — Peter D Le
(74) *Attorney, Agent, or Firm* — WPAT, PC (57) ABSTRACT

A control signal transmission circuit and a control signal receiving circuit for an audio/video interface are provided. The control signal transmission circuit includes an audio/video interface encoder, a signal packaging circuit and a data allocator. The audio/video interface encoder is configured to receive an audio packet and supports a user-defined packet format. The signal packaging circuit is configured to receive a first control signal and package the first control signal into a control data packet according to the user-defined packet format. The data allocator is configured to receive a video data and a second control signal and to mix the second control signal and the video data to generate a mixed data packet. The audio/video interface encoder packages the control data packet, the mixed data packet and the audio packet according to an audio/video transmission protocol to generate an audio/video and control data.

13 Claims, 9 Drawing Sheets

(51) Int. Cl.
*H04N 21/63* (2011.01)
*H04N 21/233* (2011.01)

(56) References Cited

U.S. PATENT DOCUMENTS

| | | | | |
|---|---|---|---|---|
| 8,937,648 B2* | 1/2015 | Yang | H04N 13/167 | 348/51 |
| 10,447,396 B1* | 10/2019 | Li | H04B 10/40 | |
| 10,607,564 B2* | 3/2020 | Xie | G06F 3/14 | |
| 2005/0068346 A1* | 3/2005 | Ogawa | G09G 5/006 | 345/699 |
| 2006/0209745 A1* | 9/2006 | MacMullan | H04N 21/43637 | 370/328 |
| 2007/0024629 A1* | 2/2007 | Frederick | H04N 7/083 | 345/520 |
| 2007/0124780 A1* | 5/2007 | Lee | H04N 21/43615 | 725/89 |
| 2007/0174880 A1* | 7/2007 | Fite | H04N 21/44016 | 725/87 |
| 2007/0192787 A1* | 8/2007 | Hong | G06F 21/10 | 725/25 |
| 2008/0266241 A1* | 10/2008 | Kimura | G09G 3/3406 | 345/102 |
| 2009/0030635 A1* | 1/2009 | Horan | H04L 1/205 | 702/85 |
| 2011/0157310 A1* | 6/2011 | Mitani | H04N 21/43632 | 348/43 |
| 2012/0075969 A1* | 3/2012 | Watanabe | G11B 27/034 | 369/30.08 |
| 2012/0127367 A1* | 5/2012 | Glen | G09G 5/393 | 348/571 |
| 2012/0215952 A1* | 8/2012 | Werner | G09G 5/006 | 710/33 |
| 2013/0076777 A1* | 3/2013 | Park | G09G 5/02 | 345/594 |
| 2014/0139541 A1* | 5/2014 | Willaert | G09G 5/003 | 345/589 |
| 2014/0184765 A1* | 7/2014 | King | H04N 9/735 | 348/65 |
| 2015/0135209 A1* | 5/2015 | LaBosco | H04N 21/43635 | 725/31 |
| 2015/0205396 A1* | 7/2015 | Konishi | G06F 3/041 | 345/173 |
| 2015/0287370 A1* | 10/2015 | Takanashi | G09G 3/342 | 345/690 |
| 2016/0021430 A1* | 1/2016 | LaBosco | H04N 21/4367 | 725/31 |
| 2016/0283342 A1* | 9/2016 | Kambhatla | H04N 21/4143 | |
| 2017/0116138 A1* | 4/2017 | Yang | H04L 67/025 | |
| 2019/0327463 A1* | 10/2019 | Zhao | H04N 19/103 | |

* cited by examiner

CONTROL SIGNAL TRANSMISSION CIRCUIT AND CONTROL SIGNAL RECEIVING CIRCUIT FOR AUDIO/VIDEO INTERFACE

BACKGROUND OF THE INVENTION

1. Field of the Invention

The present invention generally relates to a digital audio/video interface, especially a control signal transmission circuit and a control signal receiving circuit for digital audio/video interfaces.

2. Description of Related Art

Figure 1:
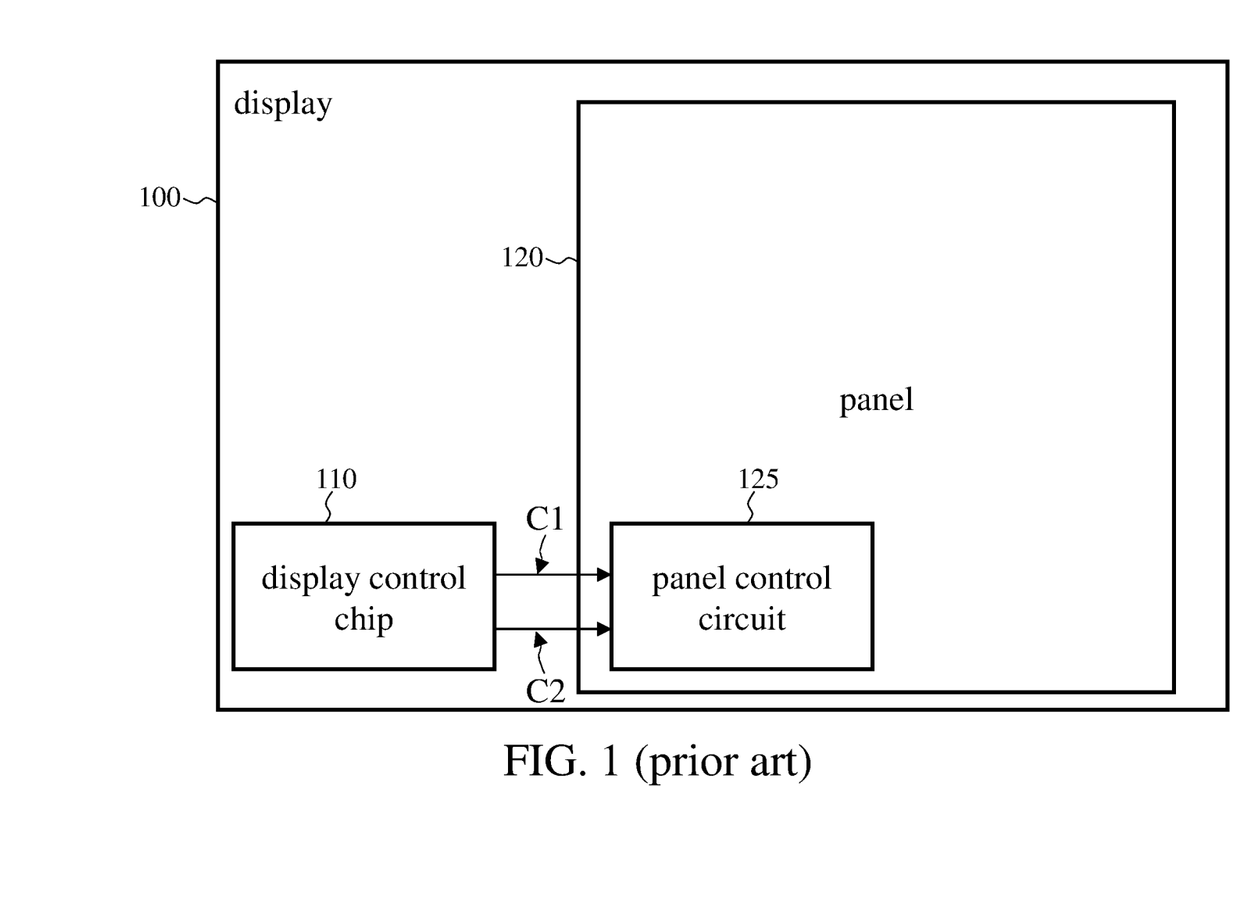
FIG. 1 shows a traditional display.

FIG. 1 shows a traditional display (e.g., a TV). The display 100 includes a display control chip 110, a panel 120, and a panel control circuit 125. The panel control circuit 125 is used for controlling the display of the panel 120, including the controlling of the displayed content (i.e., image data) and the controlling of the backlight. The display control chip 110 is electrically connected to the panel control circuit 125 through the cable C1 and the cable C2. The cable C1 is used for transmitting image signals (i.e., image data), and the cable C2 is used for transmitting control signals (i.e., control data). For instance, the control signal can be a backlight control signal. The distance between the display control chip 110 and the panel control circuit 125 cannot be as long as desired, which limits the design flexibility of multimedia devices, due to a limitation of the length of the cable C2 that is used for transmitting the control signal.

SUMMARY OF THE INVENTION

In view of the issues of the prior art, in order to increase the design flexibility of multimedia devices, an object of the present invention is to provide a control signal transmission circuit for audio/video interfaces and a control signal receiving circuit for audio/video interfaces.

A control signal transmission circuit is provided. The control signal transmission circuit includes an audio/video interface encoder and a signal packaging circuit. The audio/video interface encoder is used for receiving a video packet and an audio packet and supports a user-defined packet format. The signal packaging circuit is coupled to the audio/video interface encoder and configured to receive a control signal and package the control signal into a control data packet according to the user-defined packet format. The audio/video interface encoder packages the control data packet, the video packet and the audio packet according to an audio/video transmission protocol to generate an audio/video and control data.

A control signal receiving circuit is also provided. The control signal receiving circuit includes an audio/video interface decoder and a signal unpackaging circuit. The audio/video interface decoder supports a user-defined packet format and is configured to receive an audio/video and control data and unpackage the audio/video and control data according to an audio/video transmission protocol in order to generate a control data packet, a video packet, and an audio packet. The signal unpackaging circuit is coupled to the audio/video interface decoder and configured to receive the control data packet and unpackage the control data packet according to the user-defined packet format in order to generate a control signal.

Another control signal transmission circuit is also provided. The control signal transmission circuit includes an audio/video interface encoder and a data allocator. The audio/video interface encoder is configured to receive an audio packet. The data allocator is coupled to the audio/video interface encoder and configured to receive a video data and a control signal, and mix the control signal and the video data in order to generate a mixed data packet. The audio/video interface encoder packages the mixed data packet and the audio packet according to an audio/video transmission protocol to generate an audio/video and control data.

Another control signal receiving circuit is also provided. The control signal receiving circuit includes an audio/video interface decoder and a data deallocator. The audio/video interface decoder is configured to receive an audio/video and control data and unpackage the audio/video and control data according to an audio/video transmission protocol in order to generate a mixed data packet and an audio packet. The data deallocator is coupled to the audio/video interface decoder and configured to receive the mixed data packet and decode the mixed data packet to generate a video data and a control signal.

Another control signal transmission circuit is also provided. The control signal transmission circuit includes an audio/video interface encoder, a signal packaging circuit, and a data allocator. The audio/video interface encoder is configured to receive an audio packet and supports a user-defined packet format. The signal packaging circuit is coupled to the audio/video interface encoder and configured to receive a first control signal and package the first control signal into a control data packet according to the user-defined packet format. The data allocator is coupled to the audio/video interface encoder and configured to receive a video data and a second control signal, and mix the second control signal and the video data in order to generate a mixed data packet. The audio/video interface encoder packages the control data packet, the mixed data packet and the audio packet according to an audio/video transmission protocol to generate an audio/video and control data.

Another control signal receiving circuit is also provided. The control signal receiving circuit includes an audio/video interface decoder, a signal unpackaging circuit, and a data deallocator. The audio/video interface decoder supports a user-defined packet format and is configured to receive an audio/video and control data and unpackaging the audio/video and control data according to an audio/video transmission protocol in order to generate a mixed data packet, a control data packet, and an audio packet. The signal unpackaging circuit is coupled to the audio/video interface decoder and configured to receive the control data packet and unpackage the control data packet according to the user-defined packet format in order to generate a first control signal. The data deallocator is coupled to the audio/video interface decoder and configured to receive the mixed data packet and decode the mixed data packet to generate a video data and a second control signal.

According to the present invention, the control signal transmission circuit for audio/video interfaces and the control signal receiving circuit for audio/video interfaces can transmit or receive the control signal through the connection wire or cable of the audio/video interfaces (e.g., a High-Definition Multimedia Interface (HDMI) cable or a DisplayPort (sometimes referred to as DP for short) cable). Compared to the traditional technology, the distance between the display control chip and the panel control circuit can be increased for the multimedia device that implements the present invention, which improves the design flexibility of multimedia devices. As a result, the display control chip and the panel control circuit can be arranged in two separate devices (e.g., in a host and a screen, respectively), and the control signals are transmitted between the two devices through the connection wire or cable of the audio/video interface.

These and other objectives of the present invention can be understood according to the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly.

The disclosure herein includes control signal transmission circuits and control signal receiving circuits for audio/video interfaces. On account of that some or all elements of the control signal transmission circuits and the control signal receiving circuits could be known, the detail of such elements is omitted provided that such detail has little to do with the features of this disclosure, and that this omission nowhere dissatisfies the specification and enablement requirements.

Figure 2:
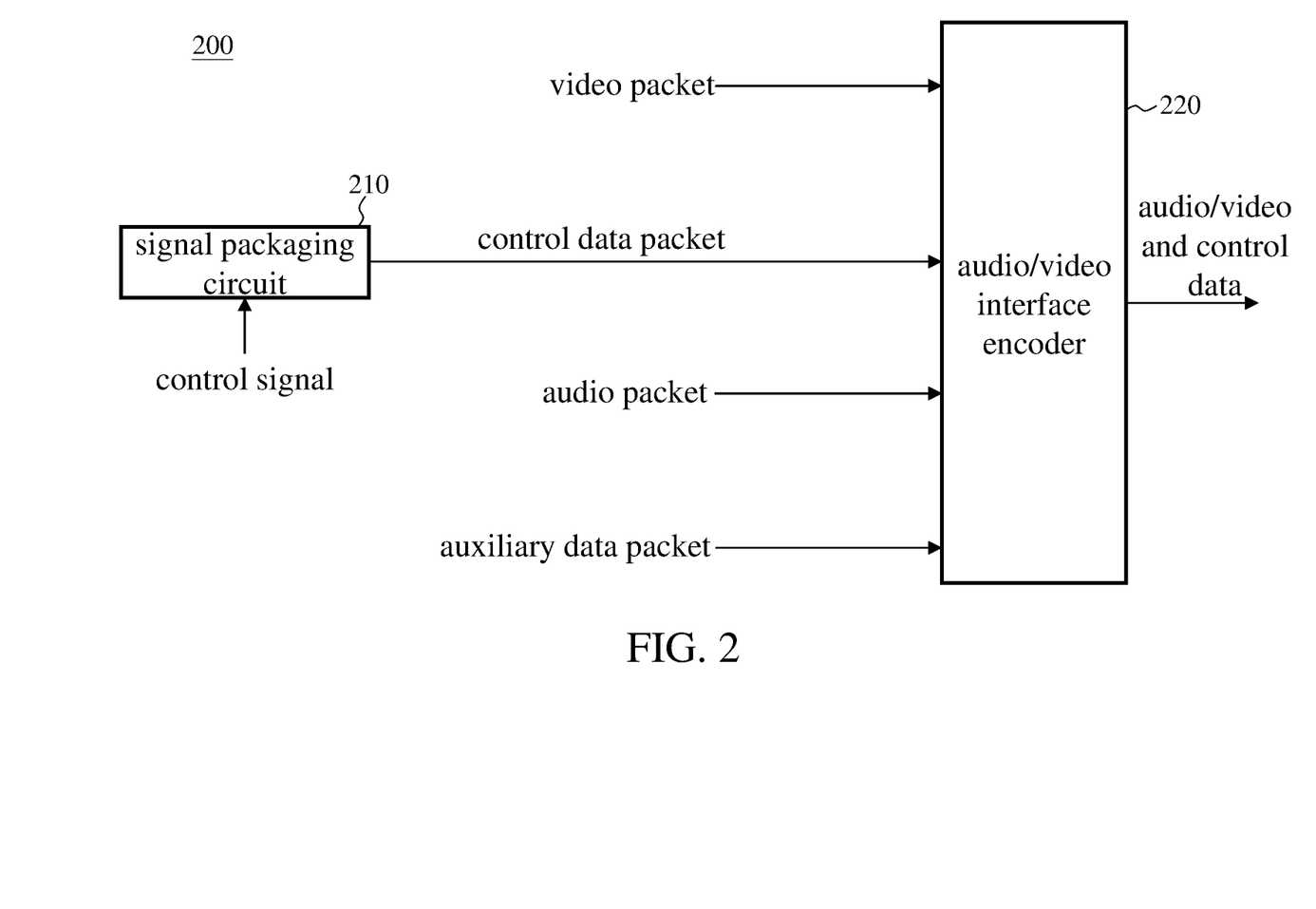
FIG. 2 shows a functional block diagram of the control signal transmission circuit for audio/video interfaces according to an embodiment of the present invention.

FIG. 2 shows a functional block diagram of the control signal transmission circuit for audio/video interfaces according to an embodiment of the present invention. The control signal transmission circuit 200 includes a signal packaging circuit 210 and an audio/video interface encoder 220. In some embodiments, the audio/video interface encoder 220 is an encoder for High-Definition Multimedia Interface (HDMI) or DisplayPort. According to the specifications of HDMI and DisplayPort, HDMI and DisplayPort allow circuit designers to define the packet format, which therefore enables the circuit designers to transmit packets in the user-defined packet format through HDMI or DisplayPort.

The signal packaging circuit 210 receives control signals (e.g., panel-related control signals, including, but not limited to, backlight control signals, panel calibration signals, and timing control (Tcon) signals) generated by the display control circuit (e.g., the display control chip, not shown), and packages the control signals according to the user-defined packet format to generate control data packets. The control signals can be serial or parallel data. The panel calibration signal is used for correcting traces caused by uneven brightness of the display. In some embodiments, the signal packaging circuit 210 further includes a register, a memory or a storage circuit, used for storing the control data packet(s) to be transmitted. In other words, in some embodiments, the signal packaging circuit 210 has the function of storing the control data packet(s). The operation of packaging a control signal according to the user-defined packet format is to add a user-defined header to the control signal, and the user-defined header is different from the headers of packets (including, but not limited to, video packets, audio packets, and auxiliary data packets) in other predetermined formats defined in the specification of the audio/video interface encoder 220.

The audio/video interface encoder 220 receives packets in various predetermined formats as well as packets in the user-defined packet format(s) (i.e., the control data packets that the signal packaging circuit 210 generates). The video packets are generated when an audio/video processing chip (not shown) or a multimedia processing chip (not shown) packages the video data (e.g., image data) according to the specifications of the audio/video interface encoder 220. The audio packets are generated when the audio/video processing chip or the multimedia processing chip packages the audio data (e.g., sound data) according to the specifications of the audio/video interface encoder 220. The auxiliary data packets are generated when the audio/video processing chip or the multimedia processing chip packages the auxiliary data according to the specifications of the audio/video interface encoder 220. The auxiliary data, for example, can be the specifications of the audio/video data and the information that is required by the receiving end when reconstructing the audio clock. The audio/video interface encoder 220 generates audio/video and control data by performing scheduling and arbitration, according to the specification, on the video packets, audio packets, auxiliary data packets and control data packets (e.g., encoding and/or arranging the order of the packets). Performing scheduling and arbitration according to the specification of the multimedia interface is well known to people having ordinary skill in the art; thus, the details are omitted for brevity.

Figure 3:
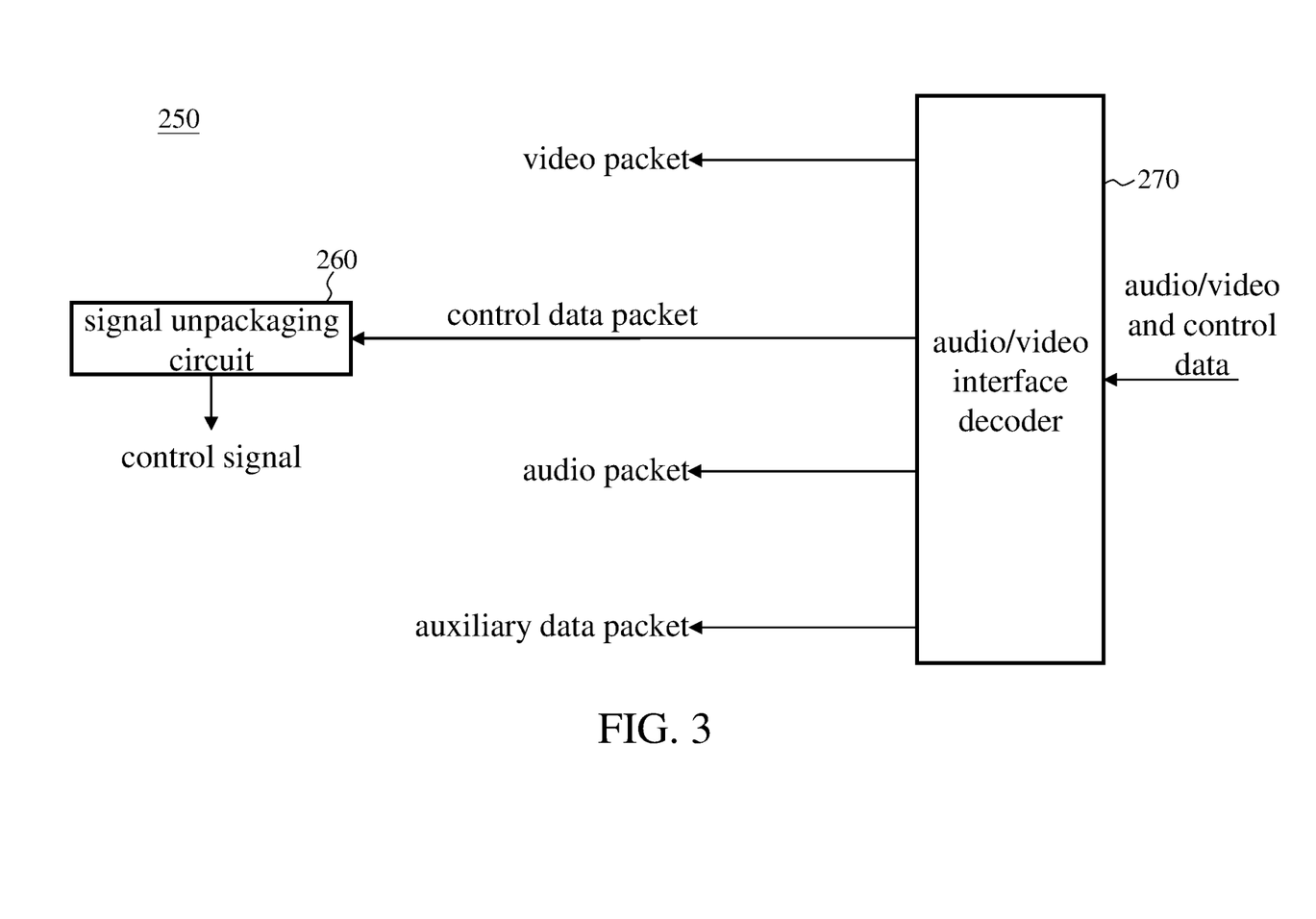
FIG. 3 shows a functional block diagram of the control signal receiving circuit for audio/video interfaces according to an embodiment of the present invention.

FIG. 3 shows a functional block diagram of the control signal receiving circuit for audio/video interfaces according to an embodiment of the present invention. The control signal receiving circuit 250 includes a signal unpackaging circuit 260 and an audio/video interface decoder 270. The audio/video interface decoder 270 is connected to the audio/video interface encoder 220 through a compatible connection wire or cable (e.g., an HDMI cable or a DisplayPort cable), and receives the audio/video and control data through the connection wire or cable. In some embodiments, the audio/video interface decoder 270 is an HDMI decoder or a DisplayPort decoder. The audio/video interface decoder 270 processes (e.g., decoding and/or unpackaging) the audio/video and control data according to the specifications to extract the video packets, audio packets, auxiliary data packets, and control data packets. The audio/video interface decoder 270 can also be referred to as a data recovery circuit. The video packets, audio packets, and auxiliary data packets are processed (e.g., unpackaged) by the video circuit, audio circuit, and auxiliary data processing circuit, respectively;

thus, the video data, audio data, and auxiliary data contained in the corresponding packets can be obtained accordingly. The control data packets are processed by the signal unpackaging circuit 260.

The signal unpackaging circuit 260 is coupled or electrically connected to the audio/video interface decoder 270 and used for unpackaging the control data packets according to the user-defined packet format to generate the control signals. In other words, as long as the user-defined packet format is determined in advance between the control signal transmission circuit 200 (i.e., the multimedia data transmitting end) and the control signal receiving circuit 250 (i.e., the multimedia data receiving end), the control signal receiving circuit 250 can successfully unpackage the control data packets to obtain the control signals. In this way, the panel control circuit (such as the panel control circuit 125 in the prior art of FIG. 1, but not shown in FIG. 3) of the receiving end (which includes a display or panel) can control the backlight and/or calibrate the panel according to the control signal(s). The control signal can be serial or parallel data.

Figure 4:
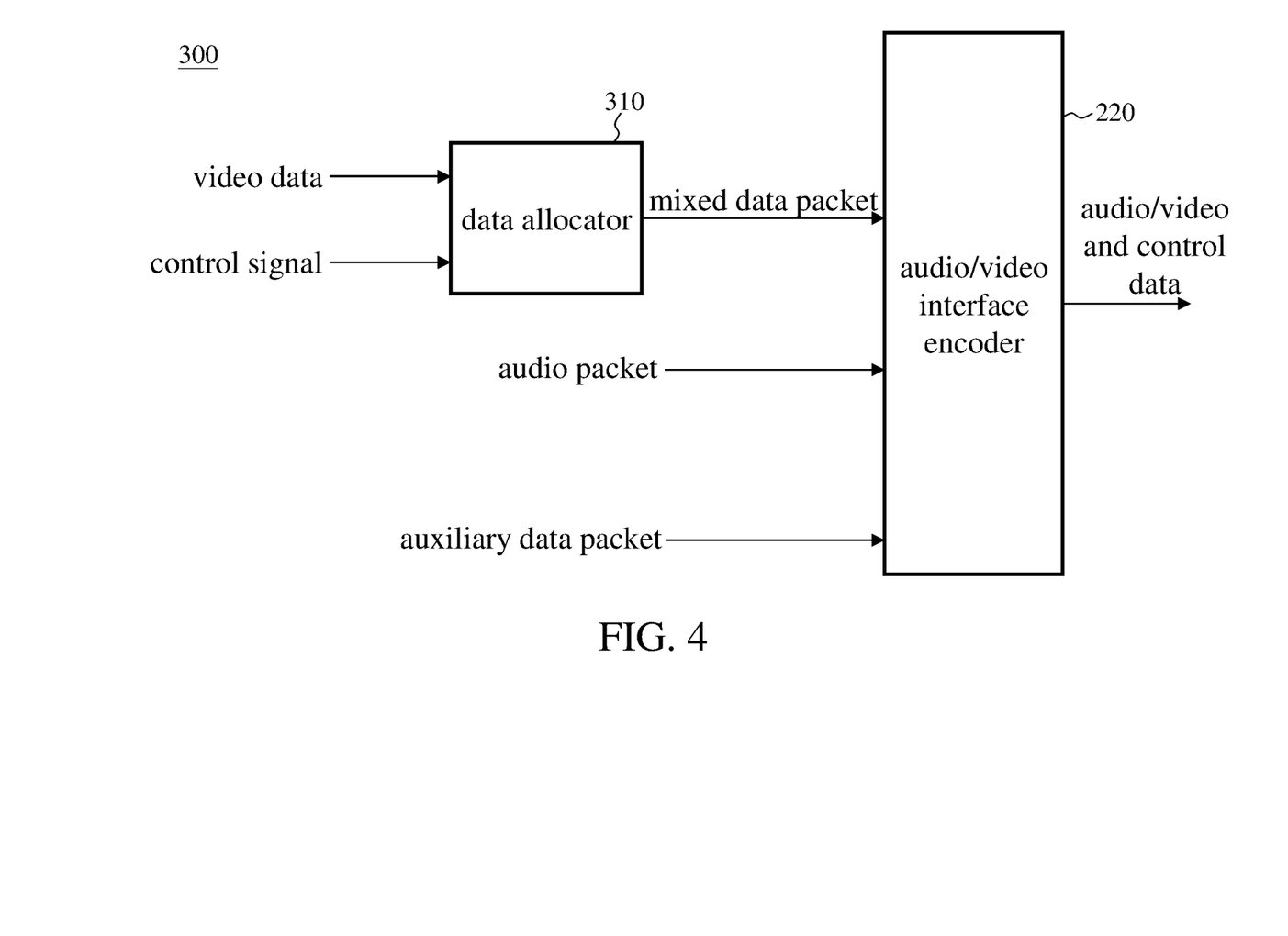
FIG. 4 shows a functional block diagram of the control signal transmission circuit for audio/video interfaces according to another embodiment of the present invention.

FIG. 4 shows a functional block diagram of the control signal transmission circuit for audio/video interfaces according to another embodiment of the present invention. The control signal transmission circuit 300 includes a data allocator 310 and an audio/video interface encoder 220. The data allocator 310 receives video data and control signal(s), and mixes the video data and the control signal(s) to generate a mixed data packet. More specifically, the video data includes multiple frames, and each frame includes multiple sets of line data; the data allocator 310 places or inserts the control signal(s) in the blank area (including horizontal front porch (HFP) and/or horizontal back porch (HBP)) between sets of line data, or places or inserts the control signal(s) in the blank area (including vertical front porch (VFP) and/or vertical back porch (VBP)) between frames. As a result, the mixed data packet contains the video data and the control signal(s). The mixed data packet is transmitted in the form of a video packet. In other words, the audio/video interface encoder 220 treats the mixed data packet as a video packet. The audio/video interface encoder 220 schedules and arbitrates the audio packets, auxiliary data packets, and mixed data packets according to the specifications to generate the audio/video and control data. The control signal can be serial or parallel data.

In some embodiments, the data allocator 310 places the control signal(s) corresponding to the next frame (the $(n+1)^{th}$ frame, n being a positive integer) in the blank area (including HFP, HBP, and/or VBP) of the current frame (the $n^{th}$ frame).

Figure 5:
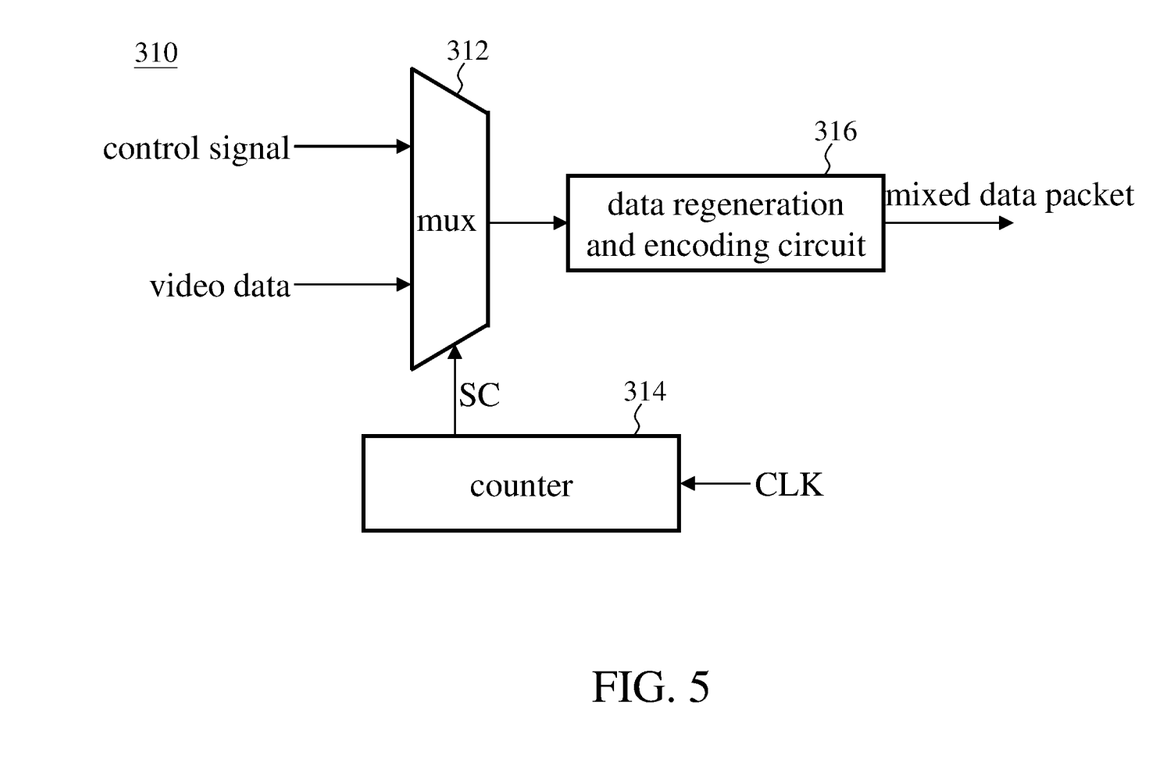
FIG. 5 is a functional block diagram of the data allocator 310 according to an embodiment.

FIG. 5 is a functional block diagram of the data allocator 310. The data allocator 310 includes a multiplexer (mux) 312, a counter 314, and a data regeneration and encoding circuit 316. The multiplexer 312 receives the control signal and the video data, and outputs the control signal or the video data according to the selection signal SC generated by the counter 314. In some embodiments, the counter 314 includes a pixel counter (not shown) and a line counter (not shown), and the pixel counter and line counter count according to the system clock CLK. The counter 314 knows the start and end of one set of line data by referring to the count value of the pixel counter, and knows the start and end of a frame by referring to the count value of the line counter. The counter 314 controls the multiplexer 312 to output the control signal between sets of line data or between frames. For example, if the control signal is to be placed or inserted in the blank area between sets of line data, the counter 314 controls the multiplexer 312 to output the control signal between the end of one set of line data and the start of the next set of line data, and controls the multiplexer 312 to output video data at time intervals other than the blank area. In another example, if the control signal is to be placed or inserted in the blank area between frames, the counter 314 controls the multiplexer 312 to output the control signal between the end of one frame and the start of the next frame, and controls the multiplexer 312 to output video data at time intervals other than the blank area.

The data regeneration and encoding circuit 316 combines the control signal(s) and the video data according to the order in which it receives the control signal(s) and the video data, and packages and/or encodes the control signal(s) and the video data into the mixed data packet. The mixed data packet and the video packet that contains only video data have the same format, but are different in data amount. More specifically, when the control signal(s) is/are placed or inserted in the blank area between two sets of line data, the mixed data is redefined for its amount of line data, such that the amount of line data that the redefined mixed data packet contains is greater than the amount of line data that the video packet containing only the video data contains. When the control signal(s) is/are placed or inserted in the blank area between frames, the mixed data is redefined for its amount of frame data, such that the amount of frame data that the redefined mixed data packet contains is greater than the amount of frame data that the video packet containing only the video data contains.

Figure 6:
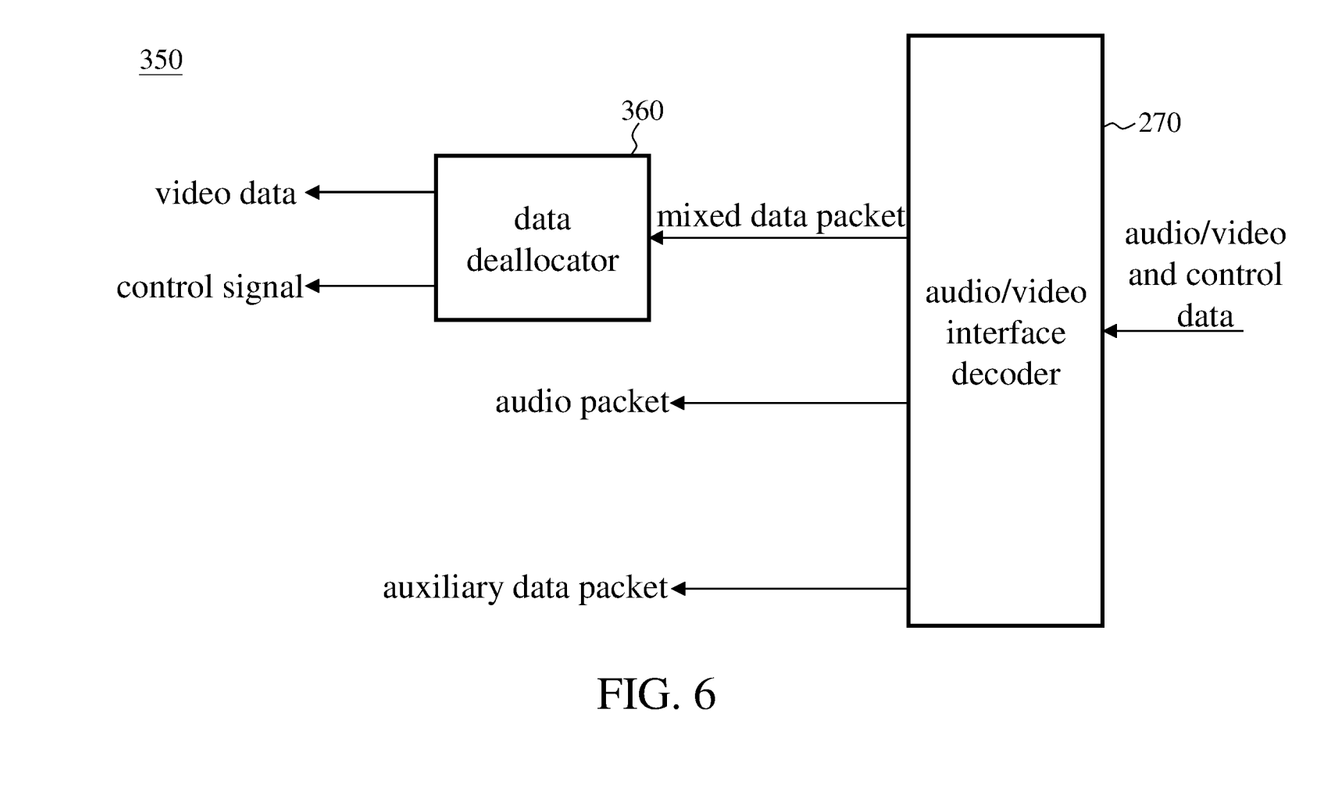
FIG. 6 shows a functional block diagram of the control signal receiving circuit for audio/video interfaces according to another embodiment of the present invention.

FIG. 6 shows a functional block diagram of the control signal receiving circuit for audio/video interfaces according to an embodiment of the present invention. The control signal receiving circuit 350 includes a data deallocator 360 and an audio/video interface decoder 270. The audio/video interface decoder 270 is connected to the audio/video interface encoder 220 through a compatible connection wire or cable (e.g., an HDMI cable or a DisplayPort cable), and receives audio/video and control data through the connection wire or cable. The audio/video interface decoder 270 processes (e.g., decoding and/or unpackaging) the audio/video and control data according to the specifications to extract the audio packets, auxiliary data packets, and mixed data packets. The data deallocator 360 processes the mixed data packet to extract the control signal(s) and the video data that the mixed data packet contains. As a result, the panel control circuit (such as the panel control circuit 125 in the prior art of FIG. 1, but not shown in FIG. 6) of the receiving end (which includes a display or panel) can control the backlight and/or calibrate the panel according to the control signal(s). The control signal can be serial or parallel data.

Figure 7:
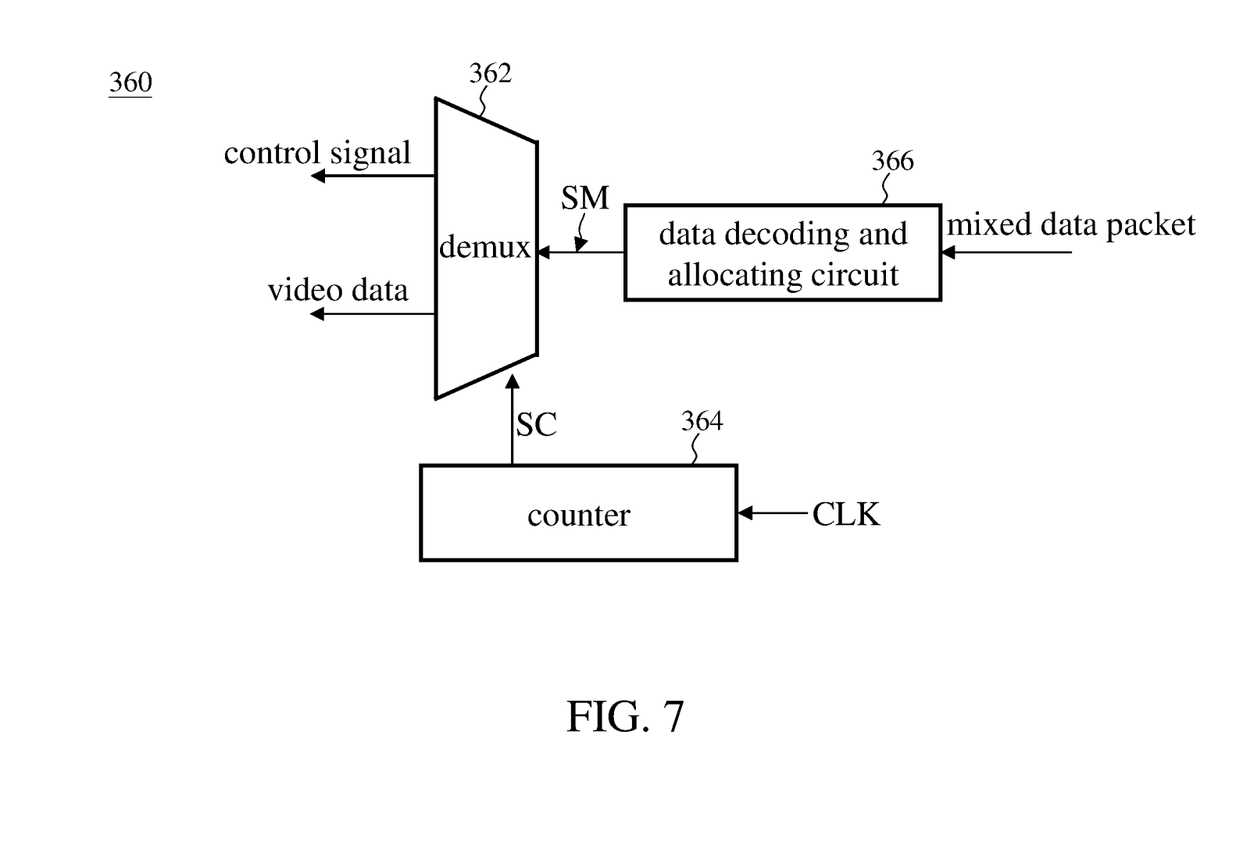
FIG. 7 is a functional block diagram of the data deallocator 360 according to an embodiment.

FIG. 7 is a functional block diagram of the data deallocator 360. The data deallocator 360 includes a demultiplexer (demux) 362, a counter 364, and a data decoding and allocating circuit 366. The data decoding and allocating circuit 366 decodes the mixed data packet and then outputs a mixed signal SM, which includes the control signal(s) and video data. In some embodiments, the counter 364 includes a pixel counter (not shown) and a line counter (not shown), both counting according to the system clock CLK. The counter 364 knows the start and end of one set of line data by referring to the count value of the pixel counter, and knows the start and end of a frame by referring to the count value of the line counter. The demultiplexer 362 outputs the control signal(s) or video data in the mixed signal SM according to the selection signal SC generated by the counter 364. The operation of the demultiplexer 362 is the reverse operation of the multiplexer 312 in FIG. 5; the operation details are familiar to people having ordinary skill in the art and thus omitted for brevity.

In some embodiments, the control signal receiving circuit 350 uses a timing recovery mechanism to synchronize the system clock CLK at the receiving end with the system clock CLK at the transmitting end.

Figure 8:
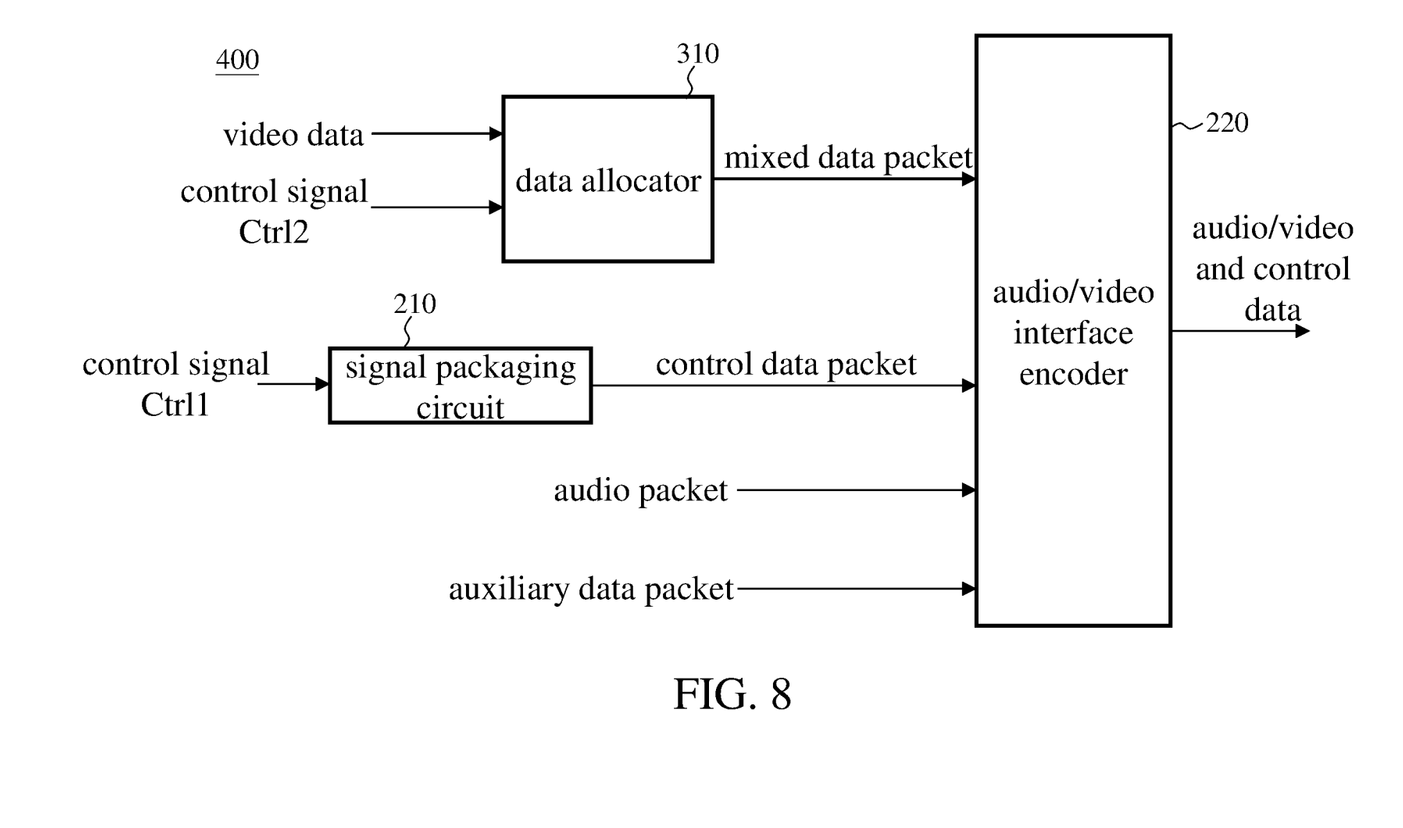
FIG. 8 shows a functional block diagram of the control signal transmission circuit for audio/video interfaces according to another embodiment of the present invention.

FIG. 8 shows a functional block diagram of the control signal transmission circuit for audio/video interfaces according to another embodiment of the present invention. The control signal transmission circuit 400 includes a signal packaging circuit 210, a data allocator 310, and an audio/video interface encoder 220. The control signal transmission circuit 400 is a combination of the control signal transmission circuit 200 and the control signal transmission circuit 300. In the embodiment of FIG. 8, the signal packaging circuit 210 and the data allocator 310 receive and process different control signals. For example, the control signal Ctrl1 is one of the backlight control signal and the panel calibration signal, while the control signal Ctrl2 is the other. In other words, the control data packet includes one of the backlight control signal and the panel calibration signal, and the mixed data packet includes another one.

Figure 9:
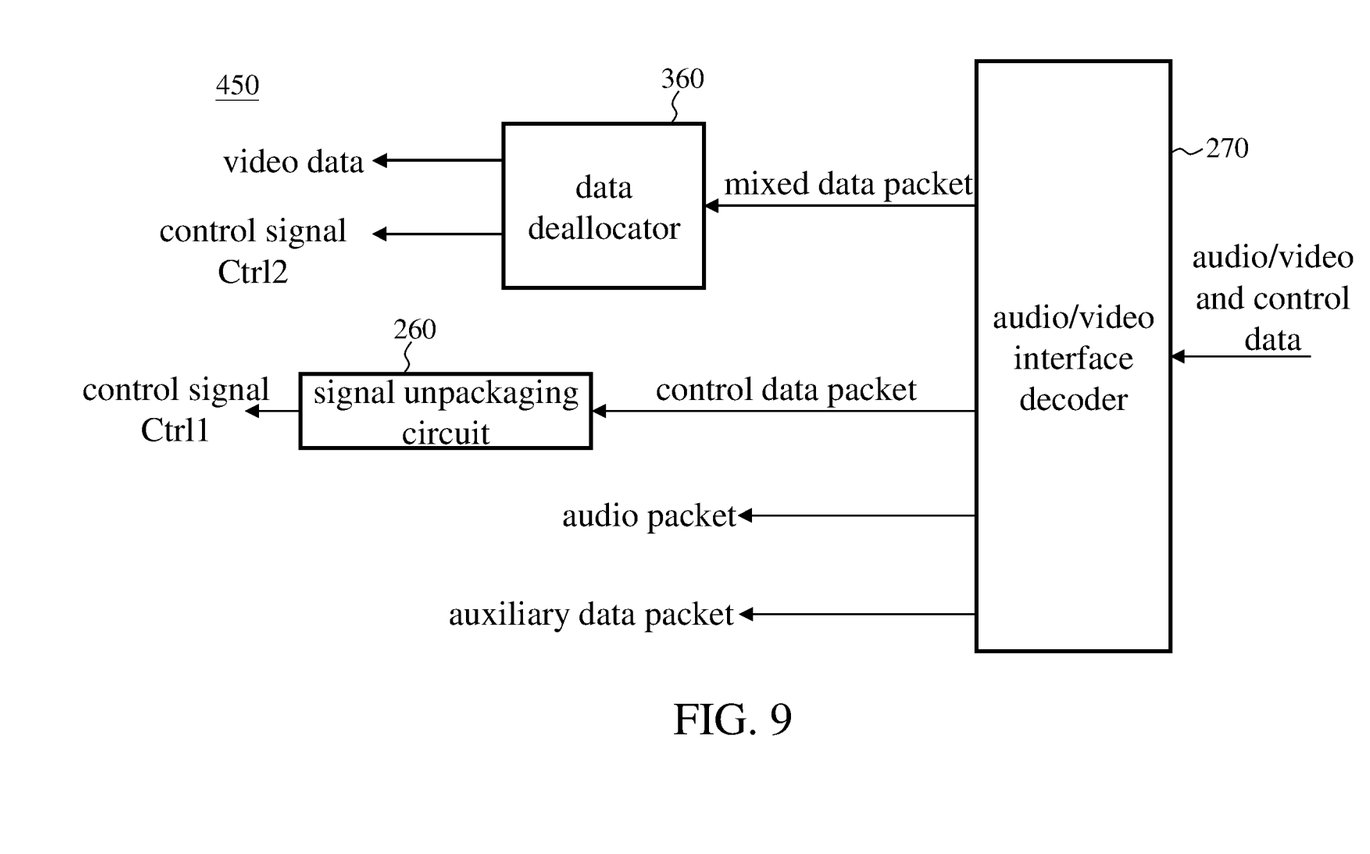
FIG. 9 shows a functional block diagram of the control signal receiving circuit for audio/video interfaces according to another embodiment of the present invention.

FIG. 9 shows the control signal receiving circuit corresponding to FIG. 8. The control signal receiving circuit 450 includes a signal unpackaging circuit 260, a data deallocator 360, and an audio/video interface decoder 270. The signal unpackaging circuit 260 outputs one of the backlight control signal and the panel calibration signal, while the data deallocator 360 outputs the other.

As in the embodiments of FIGS. 8 and 9, different control signals are arranged at different places in the audio/video and control data, that is, different control signals are transmitted and received using different signal formats. The control signal receiving circuit 250 of FIG. 3 and the control signal receiving circuit 350 of FIG. 6 can distinguish between the control signal Ctrl1 and the control signal Ctrl2 according to their signal contents (e.g., headers, but not limited thereto). In the embodiments of FIGS. 8 and 9, the control signal receiving circuit 450 can distinguish between the control signal Ctrl1 and the control signal Ctrl2 according to their signal formats (i.e., according to whether the control signal is carried by the mixed data packet or by the control data packet) or according to their sources (i.e., according to whether the control signal is outputted by the signal unpackaging circuit 260 or by the data deallocator 360).

The backlight control signal and the panel calibration signal mentioned in the above embodiments are intended to illustrate the invention by way of examples, rather than to limit the scope of the claimed invention; people having ordinary skill in the art can appropriately apply the present invention to other types of control signals based on the above discussions. HDMI and DisplayPort discussed in the above embodiments are intended to illustrate the invention by way of examples, rather than to limit the scope of the claimed invention; people having ordinary skill in the art can appropriately apply the present invention to other types of multimedia audio/video interfaces based on the above discussions.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Please note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A control signal transmission and receiving circuit for audio/video interfaces, comprising:
   a control signal transmission circuit, comprising:
      an audio/video interface encoder which is configured to receive a video packet and an audio packet and support a user-defined packet format; and
      a signal packaging circuit, coupled to the audio/video interface encoder and configured to receive a control signal and package the control signal into a control data packet according to the user-defined packet format;
      wherein the audio/video interface encoder packages the control data packet, the video packet and the audio packet according to an audio/video transmission protocol in order to generate an audio/video and control data; and
   a control signal receiving circuit, comprising:
      an audio/video interface decoder which supports the user-defined packet format and is configured to receive the audio/video and control data and unpackage the audio/video and control data according to the audio/video transmission protocol in order to generate the control data packet, the video packet, and the audio packet; and
      a signal unpackaging circuit, coupled to the audio/video interface decoder and configured to receive the control data packet and unpackage the control data packet according to the user-defined packet format in order to generate the control signal;
   wherein the control signal comprises a backlight control signal and a panel calibration signal.

2. The control signal transmission and receiving circuit for audio/video interfaces of claim 1, wherein the audio/video interface encoder is an encoder for High-Definition Multimedia Interface, and the audio/video interface decoder is a decoder for High-Definition Multimedia Interface.

3. The control signal transmission and receiving circuit for audio/video interfaces of claim 1, wherein the audio/video interface encoder is an encoder for DisplayPort, and the audio/video interface decoder is a decoder for DisplayPort.

4. A control signal transmission and receiving circuit for audio/video interfaces, comprising:
a control signal transmission circuit, comprising:
an audio/video interface encoder configured to receive an audio packet; and
a data allocator, coupled to the audio/video interface encoder and configured to receive a video data and a control signal, and mix the control signal and the video data in order to generate a mixed data packet;
wherein the audio/video interface encoder packages the mixed data packet and the audio packet according to an audio/video transmission protocol in order to generate an audio/video and control data; and
a control signal receiving circuit, comprising:
an audio/video interface decoder configured to receive the audio/video and control data and unpackage the audio/video and control data according to the audio/video transmission protocol in order to generate the mixed data packet and the audio packet; and
a data deallocator, coupled to the audio/video interface decoder and configured to receive the mixed data packet and decode the mixed data packet in order to generate the video data and the control signal;
wherein the control signal comprises a backlight control signal and a panel calibration signal.

5. The control signal transmission and receiving circuit for audio/video interfaces of claim 4, wherein the data allocator comprises:
a counter, configured to generate a selection signal according to a system clock;
a multiplexer, coupled to the counter and configured to receive the control signal and the video data and output one of the control signal and the video data according to the selection signal; and
a data regeneration and encoding circuit, coupled to the multiplexer and configured to combine and encode the control signal and the video data in order to generate the mixed data packet.

6. The control signal transmission and receiving circuit for audio/video interfaces of claim 4, wherein the data deallocator comprises:
a data decoding and allocating circuit, configured to decode the mixed data packet to generate a mixed signal, the mixed signal comprising the control signal and the video data;
a counter, configured to generate a selection signal according to a system clock; and
a demultiplexer, coupled to the counter and the data decoding and allocating circuit and configured to receive the mixed signal and outputting one of the control signal and the video data according to the selection signal.

7. The control signal transmission and receiving circuit for audio/video interfaces of claim 4, wherein the audio/video interface encoder is an encoder for High-Definition Multimedia Interface, and the audio/video interface decoder is a decoder for High-Definition Multimedia Interface.

8. The control signal transmission and receiving circuit for audio/video interfaces of claim 4, wherein the audio/video interface encoder is an encoder for DisplayPort, and the audio/video interface decoder is a decoder for DisplayPort.

9. A control signal transmission and receiving circuit for audio/video interfaces, comprising:
a control signal transmission circuit, comprising:
an audio/video interface encoder which is configured to receive an audio packet and support a user-defined packet format;
a signal packaging circuit, coupled to the audio/video interface encoder and configured to receive a first control signal and package the first control signal into a control data packet according to the user-defined packet format; and
a data allocator, coupled to the audio/video interface encoder and configured to receive a video data and a second control signal, and mix the second control signal and the video data in order to generate a mixed data packet;
wherein the audio/video interface encoder packages the control data packet, the mixed data packet and the audio packet according to an audio/video transmission protocol in order to generate an audio/video and control data; and
a control signal receiving circuit, comprising:
an audio/video interface decoder which supports the user-defined packet format and is and configured to receive the audio/video and control data and unpackage the audio/video and control data according to the audio/video transmission protocol in order to generate the mixed data packet, the control data packet and the audio packet;
a signal unpackaging circuit, coupled to the audio/video interface decoder and configured to receive the control data packet and unpackage the control data packet according to the user-defined packet format in order to generate the first control signal; and
a data deallocator, coupled to the audio/video interface decoder and configured to receive the mixed data packet and decode the mixed data packet in order to generate the video data and the second control signal;
wherein the first control signal is one of a backlight control signal and a panel calibration signal, and the second control signal is another one of the backlight control signal and the panel calibration signal.

10. The control signal transmission and receiving circuit for audio/video interfaces of claim 9, wherein the data allocator comprises:
a counter configured to generate a selection signal according to a system clock;
a multiplexer, coupled to the counter and configured to receive the second control signal and the video data and output one of the second control signal and the video data according to the selection signal; and
a data regeneration and encoding circuit, coupled to the multiplexer and configured to combine and encode the second control signal and the video data in order to generate the mixed data packet.

11. The control signal transmission and receiving circuit for audio/video interfaces of claim 9, wherein the data deallocator comprises:
a data decoding and allocating circuit configured to decode the mixed data packet to generate a mixed signal, the mixed signal comprising the second control signal and the video data;
a counter configured to generate a selection signal according to a system clock; and
a demultiplexer, coupled to the counter and the data decoding and allocating circuit and configured to receive the mixed signal and output one of the second control signal and the video data according to the selection signal.

12. The control signal transmission and receiving circuit for audio/video interfaces of claim 9, wherein the audio/video interface encoder is an encoder for High-Definition Multimedia Interface, and the audio/video interface decoder is a decoder for High-Definition Multimedia Interface.

13. The control signal transmission and receiving circuit for audio/video interfaces of claim 9, wherein the audio/video interface encoder is an encoder for DisplayPort, and the audio/video interface decoder is a decoder for DisplayPort.

* * * * *